May 14, 1957 R. A. KEPNER 2,791,878
ASPARAGUS HARVESTER
Filed Sept. 4, 1953 3 Sheets-Sheet 2
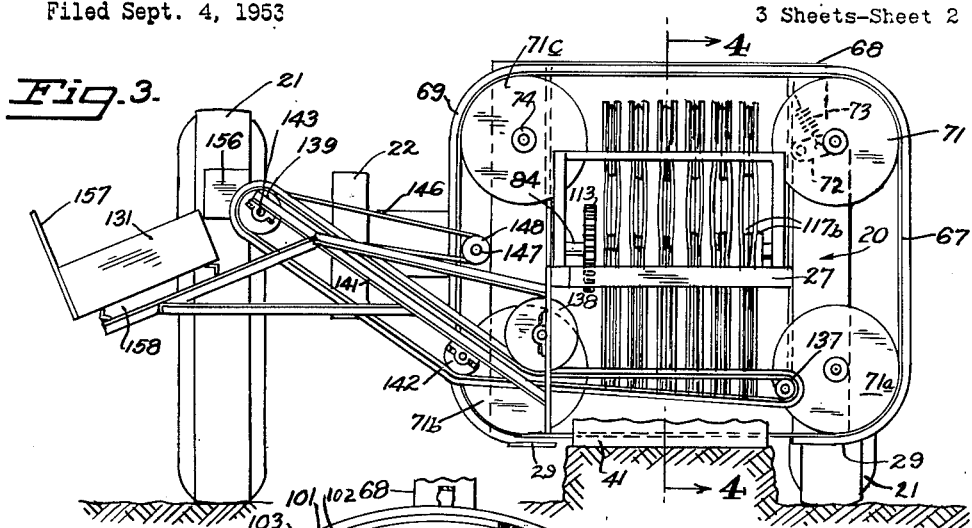
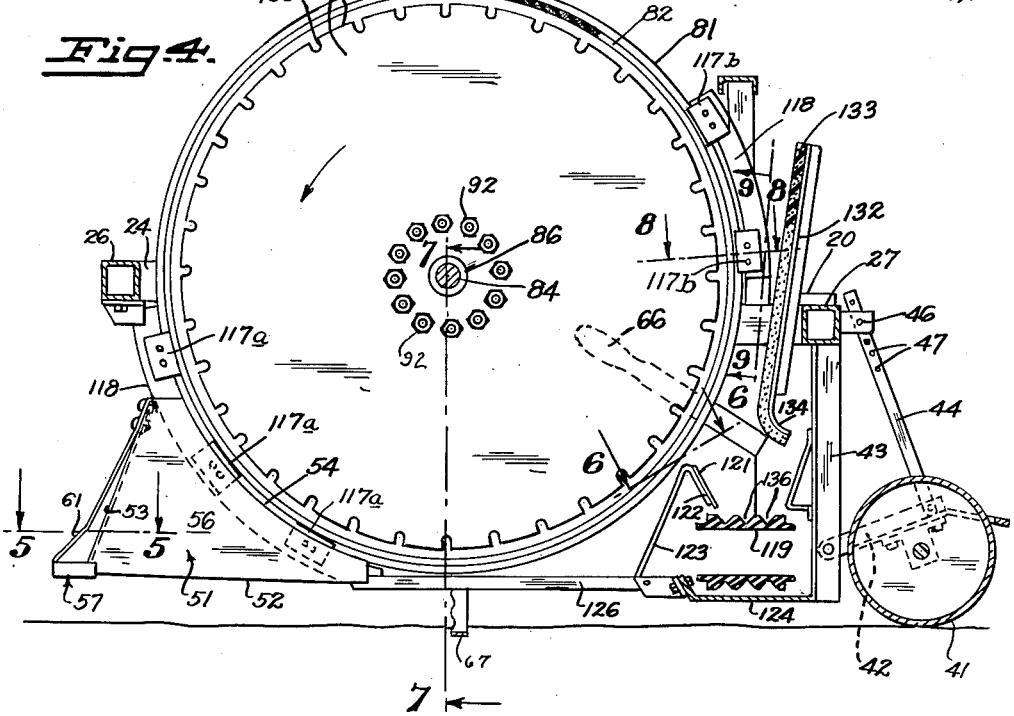
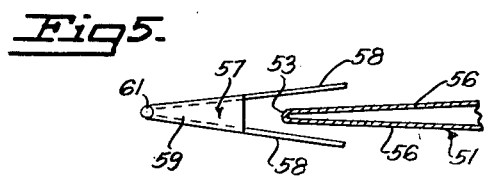
INVENTOR.
ROBERT A. KEPNER
BY
Townsend, Townsend and Hoppe
ATTORNEYS

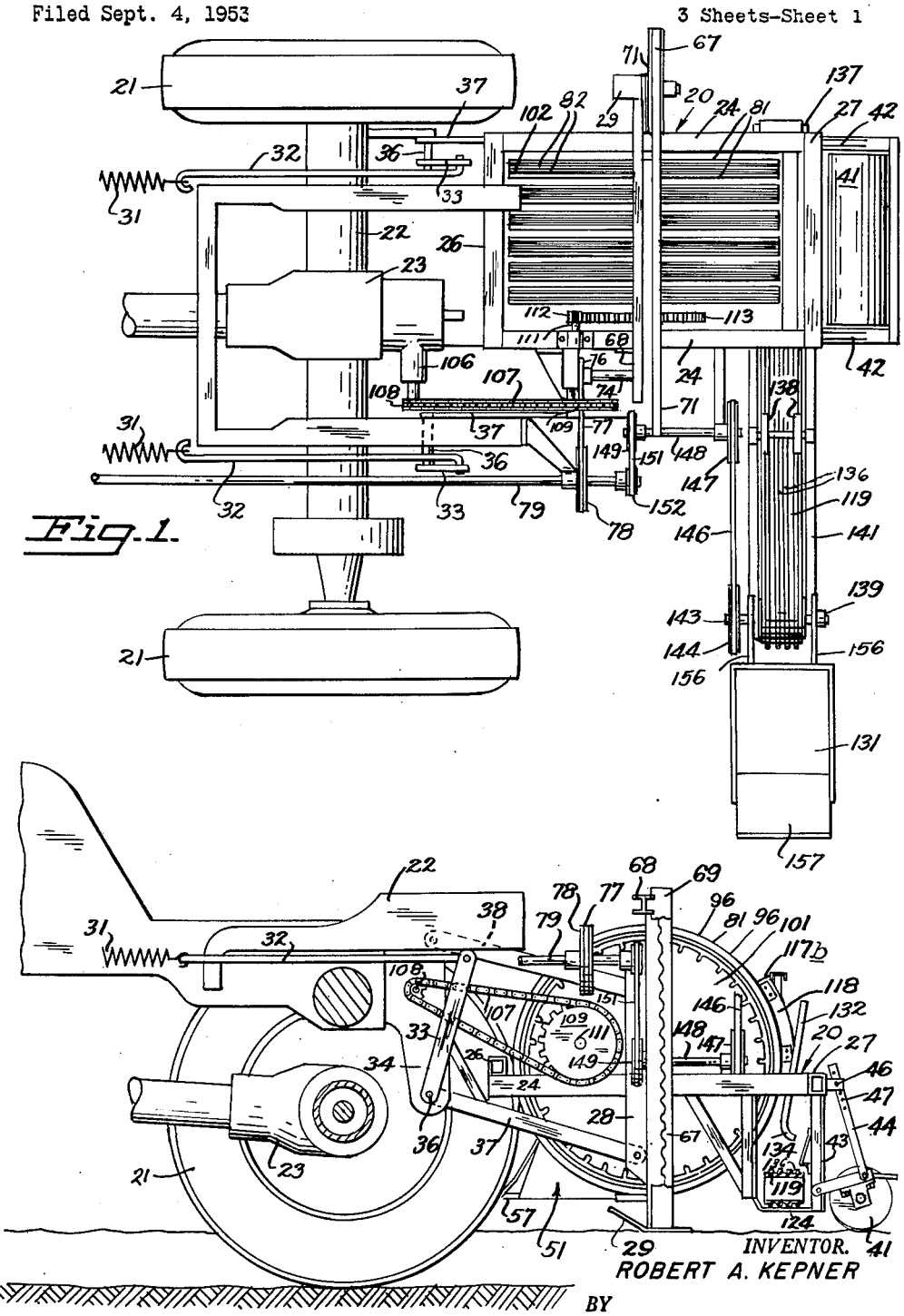

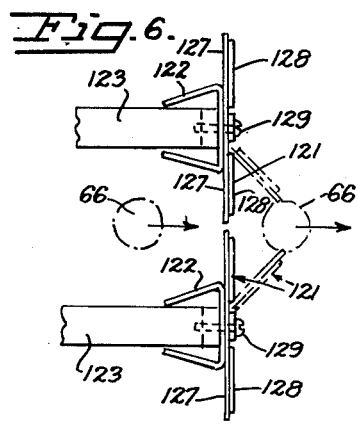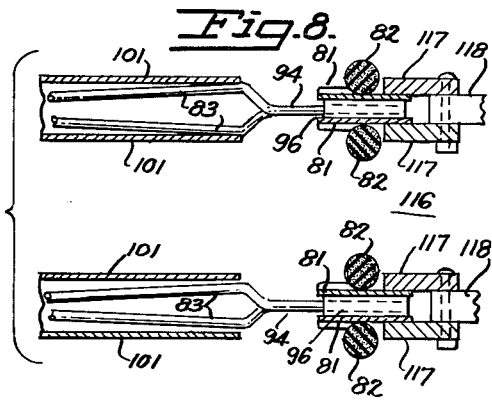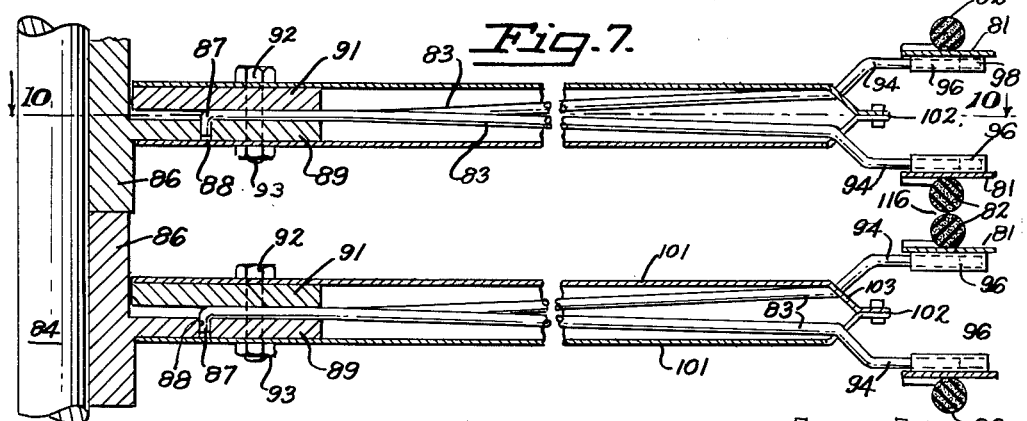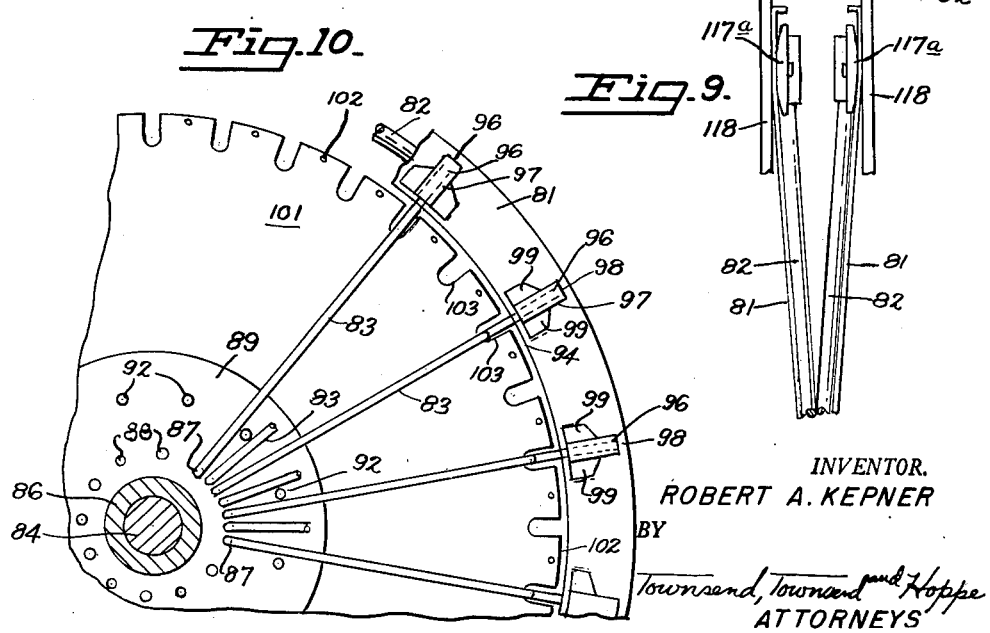

United States Patent Office 2,791,878
Patented May 14, 1957

2,791,878

ASPARAGUS HARVESTER

Robert A. Kepner, Davis, Calif., assignor to The Regents of the University of California, Berkeley, Calif., a corporation of California Application September 4, 1953, Serial No. 378,574

22 Claims. (Cl. 56—327)

This invention relates to new and useful improvements in asparagus harvester.

At the present time green asparagus is harvested by hand, a crew of laborers cutting the spears from the underlying plants with a knife. Spears of the desired length are cut by hand every day or two during a period of several months. The peculiar characteristics of asparagus which have hitherto made this method of harvesting essential are several. In the first place, the asparagus plants are grown in long, raised beds, two to three feet wide. The spears do not grow in straight rows, but spread out in a widely scattered pattern. Secondly, the height attained by the spears between cuttings is subject to wide variation. Thirdly, the thickness or diameter of the spears likewise is random. Fourthly, the spears are easily damaged and broken, particularly the tender tip, which precludes rough handling during harvesting. Accordingly, it is the principal object of the present invention to provide a mechanical harvester for green asparagus by compensating for the obstacles which have hitherto made mechanical harvesting impossible.

The harvester is advanced along the bed behind a tractor, the spears being sawed off by a rapidly moving saw at a set level slightly below the raised surface of the bed. Prior to being severed, the spears are gently bent to one side or the other without damage so that they pass into a plurality of channels defined by dividers at the front of the harvester. At the instant before severing, the spears are grasped by resilient annular rings, there being one set of rings for each channel, and the rings raise the severed spears and move them backward to a transversely moving conveyor which deposits the spears with the tips substantially aligned in one direction in a hopper at one side of the harvester.

Thus the scattered location of the spears within the bed is accommodated by the dividers which urge the spears within the channels without crushing or breakage. The random heights of the spears are accommodated by cutting all spears at a set level, regardless of the height, thus requiring less frequent cuttings than by hand. The random thickness of the spears is overcome by employing very flexible gripping means to carry the spears from the position of cutting to the conveyor. The easily-damaged nature of the asparagus is accommodated by at all times moving the spears by resiliently mounted means which prevent rough handling which might otherwise impair the commercial value of the product.

At the same time, the harvester materially reduces the labor required to harvest a bed of asparagus. The hand-cutting operation is eliminated, thereby reducing the cost of harvesting and eliminating the hazard that a labor supply will not be available during the relatively long harvest period.

In the drawings in which in certain views parts have been omitted for purpose of clarity of illustration:

Fig. 1 is a top plan of the harvester showing part of the tractor to which the harvester is connected.

Fig. 2 is a side elevation thereof with one tractor wheel removed.

Fig. 3 is an end elevation with parts broken away.

Fig. 4 is an enlarged longitudinal vertical section taken substantially along line 4—4 of Fig. 3.

Fig. 5 is a fragmentary horizontal section taken substantially along line 5—5 of Fig. 4.

Fig. 6 is a fragmentary section taken substantially along line 6—6 of Fig. 4.

Fig. 7 is a vertical section taken substantially along line 7—7 of Fig. 4 and showing the gripper rings in gripping position.

Fig. 8 is a fragmentary view showing a portion of the structure of Fig. 7 with the gripper rings shown in spread-apart position taken substantially along line 8—8 of Fig. 4.

Fig. 9 is a peripheral profile of the grippers taken substantially along line 9—9 of Fig. 4.

Fig. 10 is a fragmentary vertical section taken substantially along line 10—10 of Fig. 7.

Green asparagus is commonly grown in raised beds two to three feet wide, the roots or crowns of the asparagus plants, particularly after several years of growth, tending to spread out so that, instead of being in straight rows, the spears are scattered haphazardly throughout the bed. Further, by reason of variation of growth of the individual plants and individual spears on the same plant, the spears tend to be of random lengths and diameters. In addition, the spears are easily damaged at the time of cutting. The foregoing characteristics of asparagus plantings present considerable difficulty in mechanical harvesting which the instant invention tends to overcome. Provision is made for harvesting all of the spears in a bed of a maximum predetermined width, regardless of the staggered location of the spears within the bed.

As shown in the accompanying drawings, six sets of gripper rings approximately two and one-half inches apart are provided to accommodate a bed of a width of approximately fifteen inches. It will be understood, however, that if a wider or narrower bed is to be harvested, the number of pairs of gripper rings may be increased or decreased accordingly. By reason of the dividers, hereinafter described in detail, the spears are directed between pairs of gripper rings regardless of their scattered location, the means for directing the spears between the rings being such as to prevent damage to the spears. The random lengths of the spears are accommodated by cutting the spears at a set level slightly below the ground level, regardless of the height of the individual spears. The random thickness of the spears is accommodated by employing resilient gripping means which will handle varying diameter of spears.

By way of summary of the operation of the machine hereinafter described, it may be said that the mechanism is mounted on a suitable frame which is suspended from a conventional tractor. On the frame there is supported at the forward end a set of seven dividers which gently spread the spears apart in such a manner as to divide them into six channels or pathways. As has been explained, the number of channels may be increased or decreased as required, depending upon the width of the bed to be harvested. For each channel there is provided, suitably mounted on the frame, a pair of gripper rings which function to grip the spear at the appropriate time shortly before cutting of the spear from the stalk, move the spear around toward the rear of the machine and then release the spear so that it may be dropped upon a conveyor which transports it to a hopper. Cutting is accomplished by a bandsaw which moves in a substantially rectangular pathway transverse of the direction of movement of the machine, which bandsaw is forced below ground level and cuts the spears from the stalks at a set level relative to the ground. By the time the spear is cut, the gripper rings have come together to grip the spear and during the transition from the sawing position to the release position the spear is held between a resiliently biased pair of annular rings of sponge rubber or the like, which securely hold the spear but do not damage same.

With the foregoing general description of the invention, the individual parts will hereinafter be described in detail.

Frame

The harvester is driven by and suspended from a conventional tractor the rear wheels 21 and portions of the frame 22 and drive structure 23 of which are shown in Fig. 1 and Fig. 2 of the accompanying drawings. The wheels 21 pass on either side of the raised asparagus bed. The harvester itself is mounted upon a horizontal rectangular frame 20 of rigid welded construction made up of a plurality of square hollow members, there being longitudinal members 24 on either side and a forward and rear cross member 26 and 27 respectively. Depending vertical legs 28 connect the midpoints of longitudinal members 24 to protective skids 29 on either side of the machine which also travel on either side of the raised bed. Most of the weight of the harvester is carried by the tractor and suspended from balance springs 31 which are long helical members attached to the front of the tractor and extending substantially horizontally rearwardly thereof and connected by links 32 to downwardly extending arms 33 mounted on shafts 36 supported by brackets 34 attached to frame 22, to which are also connected rearwardly extending arms 37 attached to vertical legs 28. Auxiliary support arm 38 is pivotally connected at opposite ends to the tractor and to vertical legs 28.

In order to determine the depth of cut of the harvester, a gauge roller 41 is mounted at the rear end of the machine, the roller being pivotally connected by arms 42 to rear vertical legs 43 attached to the frame and also being connected by means of upwardly extending adjustment rod 44 to frame member 27. The connection between adjustment rod 44 and member 27 is by means of a cotter pin 46 which fits within a hole 47 of a series of spaced holes in the rod. By placing the cotter pin 46 within the proper hole 47, the elevation of gauge roller 41 with respect to frame member 27 may be adjusted and thereby the depth of cut determined. The depth of cut is in turn determined by the amount which the horizontal bottom stretch of the bandsaw which cuts the spears of asparagus from the stalk is depressed below the level of the raised bed. As seen particularly in Fig. 2, the function of springs 31 is to support most of the weight of the harvester so that the gauge roller 41 functions primarily to steady rather than vertically support the superimposed mechanism.

Dividers

Mounted approximately three and one-quarter inches above the cutting level at the forward part of the harvester and depending from transverse forward frame member 26 are seven sheet metal dividers 51. The generally triangular shape of the dividers in side elevation as best shown in Figs. 4 and 5, is substantially horizontal along the bottom edge 52, downwardly and forwardly extending along the front edge or prow 53 and arcuately concave along the third edge 54 connecting the extremities of the other two edges. The dividers come to a blunt downwardly-forwardly extending prow 53 at forward working edge and the side walls 56 widen out rearwardly of the prow. Thus, spears of asparagus coming into contact with the prow 53 are pushed aside laterally into the channels between the side walls 56 so that they may suitably be grasped by the gripper rings, as hereinafter described in greater detail. In the embodiment of the invention here illustrated there is one divider 51 on each side of the machine and a divider between each pair of gripper rings; thereby channelizing the lateral movement of the spears into the six channels.

Although the dividers come to a blunt prow 53, there is, nevertheless, danger of a spear being struck so close to center that it will be broken off or otherwise damaged. To prevent this undesirable result, a triangular guide or deflector 57 is spring-suspended immediately ahead of and straddling the lower part of the prow of the divider. The deflector-guide is formed of diverging sides 58 which are short and have a connecting top 59 which, upon contacting prow 53, limits rearward movement of the deflector-guide. Deflector-guide 57 is suspended from the upper part of the divider by a downwardly and forwardly extended resilient bracket 61 which is fixed at its lower end to the apex of the deflector-guide. Thus the deflector-guide 57 may move laterally relative to the fixed divider 51 and also may move longitudinally with respect thereto. In the event that a spear of asparagus contacts the deflector-guide, said deflector-guide may move either laterally or rearwardly or a combination of the two movements against the yieldable force of the resilient bracket 61, thereby preventing damage to the spear. At the same time the force of the bracket 61 pushes the spear to one side or the other until it glances off the prow 53 and is properly channelized by the side walls 56 on one of the dividers. Thereupon the bracket 61 returns the deflector-guide to its original position in advance of prow 53. The amplitude of rearward movement of the deflector-guide is substantially three-quarters of an inch.

Saw

The asparagus spears 66 are severed from the stalk below the ground level by a bandsaw 67 which moves in a substantially rectangular path transverse to the direction of movement of the harvester at a speed of approximately 5,000 feet per minute. Saw 67 may be a 24 gauge, three-quarter inch wood cutting saw, the forward edge of which is scalloped, the lower horizontal stretch of the saw performing the cutting action, this stretch of the saw being depressed below ground level a distance which, as has been described, is governed by the adjustment of the gauge roller 41. The saw 67 and its supporting and driving mechanism are mounted upon a transversely extending substantially rectangular saw frame 68 connected to the main harvester frame and surrounding the same. A channel shaped guard 69 fastened to frame 68 surrounds the top horizontal and vertical stretches of the blade. At each of the four corners of the rectangular saw frame is mounted a pulley 71, 71a, 71b, 71c around which the saw passes. The pulley 71 at the upper right-hand corner of Fig. 3 is mounted on an arm 72 which is, in turn, pivotally mounted to the saw frame and biased by spring 73 in such manner as to keep the saw under constant tension, but the resilient nature of the spring 73 allows sufficient flexibility to prevent serious damage to the saw in the event that it strikes an obstacle which may impede its movement. The pulley at the upper left-hand corner is a drive pulley which rotates the saw, said pulley being mounted on a shaft 74 which also carries pulley 76 which is connected by belt 77 to pulley 78, which is in turn rotated by power take-off shaft 79 which is driven by a suitable power take-off on the tractor mechanism (not shown). Skids 29 protect the bandsaw 67 and lower pulleys 71 from damage when the harvester is lowered on a substantially flat surface.

Pickup mechanism

The asparagus spears 66 are gripped, immediately prior to being sawed from their stalks, by the pickup mechanism which transports the severed spears to a location toward the rear of the machine where they are dropped onto a conveyor. The pickup units are spaced substantially 2½ inches apart and, as shown in the accompanying drawings, there are six units, the number being subject to variation depending upon the width of the bed being harvested. Each unit consists of a pair of large diameter annular steel rings 81 (see especially Figs. 7 to 9). Opposed flat annular faces of pairs of annular rings 81 are provided with annular circular sponge rubber cores 82 which actually engage the spears of asparagus. The rubber rings 82 are vulcanized to the steel rings 81 and move therewith. The pairs of annular rings 81 are biased towards each other by spring wire spokes 83. Spokes 83 are spaced apart angularly approximately twenty degrees, alternate spokes being associated with one or the other adjacent rings, and extend outwardly from hub 86 mounted on axle 84 which is transversely horizontally mounted on the main frame. The inner end 87 of each spoke is bent at right angles and is received in a hole 88 in flange 89 of hub 86. The inner ends of the spoke 83 are locked in place in hub 86 by an annular member 91 which is bolted to the hub by means of bolts 92 and nuts 93. The outer ends of the wire spokes 83 are bent with an offset portion 94 near the outer extremity, the direction of the offset being such as to place the annular rings 81 of each pair of rings in closer proximity to each other. In order to permit flexing of rings 81, the outer offset portions 94 are not rigidly connected to rings 81, but are received in spring-receiving pockets, the pocket forming members being sheet metal members, U-shaped in cross-section, which are formed with a sleeve 97 in which the offset of the spring fits, the pocket-forming members being welded at their widened inner ends 99 to the annular ring so that the extremity of the spring is encased between the member 96 and the ring 81. Inwardly bent extremity 98 of the spring pocket member prevents outward displacement of the end.

To prevent the stalks of asparagus from being caught in the spokes 83, most of the length of each wire spoke is enclosed by a pair of shield discs 101, there being one disc on each side of a set of spokes. The centers of the shield discs are bolted to the flange 89 and spring retaining ring 91 and the outer ends are bent inwardly and come together at the periphery 102. In order to allow the spring wire spokes 83 to project outwardly from within the confines of the pairs of discs 101, notches 103 are cut in the periphery of the shield discs for such purposes (see Fig. 10).

The shaft 84 on which the hubs are mounted is driven to rotate at a speed such that the peripheral speed of the annular rings 81 is slightly greater than the peripheral speed of the tractor wheels 21. The drive for the shaft 84 is from the tractor, there being a speed-reducing take-off 106 at the differential of the tractor which drives by means of roller chain 107 and sprockets 108 and 109, a countershaft 111 mounted on the frame of the harvester which countershaft carries a pinion 112 meshing with gear 113 on shaft 84.

The annular gripper rings 81 and sponge rubber cores 82 mounted thereon are normally biased by spring spokes 83 to the gripping position shown in Fig. 7 wherein opposed pairs of cores 82 are close together so that a stalk which is in position 116 between cores is held thereby. However, as has been stated, at certain positions in the cycle of the gripper rings it is necessary to spread the rings apart to allow a spear 66 to move therebetween and subsequently, after the spear has been severed and carried around to discharge position, to spread apart to drop the spear. A means for spreading the gripper rings apart comprises a first and a second set of shoes 117a, 117b, respectively which may be made of graphite or other material which will not unduly wear the gripper rings away. The shoes engage the extreme periphery of the annular gripper rings 81 (see particularly Fig. 8) forcing the annular gripper rings apart. The shoes 117a, 117b may be mounted on arcuate shoe supports 118 which are suitably fastened to the frame. The peripheral profile of the gripper rings as shown in Fig. 9 is occasioned by the proper location of the shoes. The location of the shoes is best shown in Fig. 4, there being a first set of three shoes 117a (per gripper ring) in the lower front quadrant of Fig. 4 which spread the gripper rings apart to allow spears which are still connected to the stalk to enter between the gripper rings. As shown in Fig. 4, there is a second set of two shoes 117b in the upper right quadrant of Fig. 4 which spread the gripper rings apart to allow the spears to fall onto the conveyor 119 and occasion the peripheral profile illustrated in Fig. 9. Betweeen the time that the front shoes 117a release the gripper rings and the rear shoes 117b spread them apart, the gripper rings hold the asparagus spears 66 through an angular movement of approximately 75 degrees while moving from the severing position to the discharge position. After the rear shoes 117b release the gripper rings the gripper rings come together until they are again spread apart by the forward shoes.

*Mechanism for handling cut spears*

After the spears have been severed from the stalk, they are carried around by the gripper rings through an angle of approximately 75 degrees and are discharged onto a conveying mechanism. In passing to the position shown in Fig. 4, the spear has passed through a pair of gates 121 best shown in Fig. 6. The function of the gates is to prevent a spear from falling onto the ground after it has been released. The gates are mounted on substantially U-shaped backing members 122 which are supported by downwardly and forwardly extended gate supports 123 attached to rear transverse frame member 27 through horizontal member 124 which passes below the conveyor 119 and is in turn fixed to vertical legs 43 depending from transverse frame member 27. The forward end of supports 123 are joined by longitudinal ties 126 to the rearward ends of sheet metal dividers 51 and are in turn connected by arcuate members 118 to the front transverse frame member 26. The gates 121 are hingedly connected to swing rearwardly as shown in Fig. 6. Thus, each gate comprises a flexible fiber or rubber flap 127 to which is fixed a rigid stiffener 128, the rubber flaps being connected to the backing members by washers and screws 129. The flexible nature of the flaps 127 permit the gates to swing rearwardly to the dotted line position shown in Fig. 6. As a spear is carried around by the gripper rings it passes through the gate 121 as shown by the spear in dotted lines in Fig. 6 and immediately after passing through the gates is prevented from falling in the wrong direction by reason of the fact that the gates close to the solid line position shown in Fig. 6.

It is desirable that all of the spears 66 be placed in the hopper 131 with the butts extending in one direction. For such purpose a tripper plate 132 best shown in Fig. 4 is employed. As the spears are carried around by the gripper rings 81, about fifteen degrees before the gripper rings begin to release the spears the butt of each spear strikes the tripper plate 132 which aligns the spear more or less vertically so that the butt falls downwardly ahead of the tip of the spear. This prevents damage to the tender tip. The tripper plate which has a sponge-rubber covering 133 extends transversely across the machine and is tilted somewhat rearwardly at an angle as shown in Fig. 4. The lower edge 134 of the tripper plate is curved rearwardly so as to prevent damage to the spear. The spear is first engaged adjacent the lower end of the butt and as the spear is carried around before the gripper rings complete the release of the spear the spear is turned in such a way that the butt will drop downwardly.

Below tripper plate 132 and under the lower rear quadrant of the gripper rings 81 is an endless, sponge rubber-faced conveyor belt 119 with a plurality of upwardly facing longitudinally extending grooves 136. Thus the spears tend to align themselves in the grooves in the upper surface of the belt. The belt is mounted on a plurality of pulleys, there being one pulley 137 on the right side of the machine around which the belt turns through substantially 180 degrees. The upper stretch of the belt moves substantially horizontally to the left as shown in Fig. 3, and upon reaching the left-hand side of the machine then extends upwardly below idler pulleys 138 at an angle of about 30 degrees and then turns around pulley 139 on the outer end of transverse conveyor support frame 141. Still another pulley 142 keeps the upper and lower stretches of the conveyor apart. Pulley 139 is preferably the driving pulley for conveyor 119 and its shaft 143 carries pulley 144, driven by belt 146 from pulley 147 mounted on longitudinally extending shaft 148 which bears pulley 149 which is driven by belt 151 from pulley 152 on shaft 79, which is in turn driven from a power take-off on the tractor. The pulleys 138 engage only the edges of the belt 119 thereby permitting spears carried thereon to pass between them. A pair of transverse spaced guides 156 at the discharge end of the belt 119 direct the spears laterally, the butts contacting an upwardly extending longitudinal retaining plate 157 which causes the spears to fall into downwardly inclined hopper 131 held on support 158. Underlying plate 124 protects the lower section of the belt from accidental contact with the ground.

The structure and function of the mechanism for handling the cut spears is such that the spears are oriented on the conveyor belt 119 so that the spears move with the butt end forwardmost and fall into the box 131 with the butt ends toward the outside of the machine without damage to the tender tips and the spears are aligned in the box in the same direction.

*Operation*

In operation the machine is drawn through the field by the tractor, the wheels 21 of which are sufficiently far enough apart so that the bed passes between the wheels. The harvesting mechanism is sufficiently wide to cover the entire bed. The standing spears 66 are guided by sheet metal dividers 51 and deflector-guides 57 into channels 116, each accommodated by an opposed pair of annular gripper rings.

When the spears enter the channels 116 between the dividers 51 the gripper rings 81 are spread apart. The gripper rings gradually come together and grip the spears prior to the time the bandsaw 67 severs the spear. The spear is sawed below ground level and it is then carried around by the gripper rings 81 to the position shown in Fig. 4 whereupon the gripper rings begin to release the spear. Meanwhile the butt end of the spear is engaged by the lower end 134 of the deflector plate 132 which causes the spears to be oriented butt end downward and drop upon the moving conveyor belt 119. The conveyor belt moves the butt end first, the spears dropping into the grooves 136 in the top surface of the conveyor belt and being moved out to the side of the machine where they are dropped off the end of the conveyor, the butts striking the retaining plate 157 and the spears falling into the box 131.

What is claimed is:

1. An asparagus harvester comprising a frame, a transverse axle mounted on said frame, means on said frame for rotating said axle, a plurality of hubs on said axle, means connected to said frame supporting said frame above the ground, a saw mounted centrally on said frame parallel to said axle, said saw being an endless member having a lower substantially horizontal portion extending transversely of said harvester, said transverse portion being disposed below said frame and adjacent the ground, for severing asparagus spears just below ground level, means mounted on said frame for moving said saw transversely to the direction of movement of said frame, a plurality of closely spaced pairs of annular, vertical, longitudinally extending metal gripper rings, a plurality of radial spokes extending from each one of said hubs and bearing against one of said rings, said spokes being shaped and arranged to bias each ring of a pair of rings toward its mate, a first set of shoes mounted on said frame immediately below the front portion of said frame and adjacent said rings, each shoe of said first set of shoes engaging the periphery of one of said rings and forcing said ring engaged away from its mate, a second set of shoes mounted on said frame adjacent the rear portion of said frame and immediately thereabove and adjacent said rings, each shoe of said second set of shoes engaging the periphery of one of said rings and forcing the ring engaged away from its mate, and a conveyor mounted on said frame behind said rings and entirely outside the periphery of said rings, said rings, saw and shoes being positioned relative to each other to spread said rings apart prior to severing of a spear, to grip said spear between a pair of rings immediately prior to severing and to hold said spear while moving said spear to a position over said conveyor and to release said spear for deposit on said conveyor.

2. A harvester according to claim 1 which further comprises a plurality of pairs of discs mounted on said hubs, each pair of discs enclosing and shielding most of the length of a plurality of said spokes.

3. A harvester according to claim 1 in which is further provided means defining a spoke pocket mounted on a flat annular face of one of said rings, said spoke pocket being aligned radially and receiving the outer end of one of said spokes and confining said spoke solely to radial movement relative to said ring.

4. An asparagus harvester comprising a frame, a transverse axle mounted on said frame, means on said frame for rotating said axle, means connected to said frame supporting said frame above the ground, a band saw centrally mounted on said frame for transverse movement, said saw being an endless member having a lower horizontal stretch extending transversely of said harvester and disposed below said frame and approximately at ground level, a plurality of closely spaced pairs of gripper rings rotated from said shaft, a plurality of spokes radially mounted on said axle and projecting radially to bear against said rings and biasing each ring of a pair toward its mate, means on said frame for spreading the two rings of a pair of rings apart at at least two positions in a cycle or rotation, one said position being immediately below the front portion of said frame and adjacent said rings and prior to the time of severing of a spear and the other said position being adjacent the rear portion of said frame immediately above said frame and adjacent said rings and prior to the time of discharge of a spear, a conveyor on said frame outside the periphery of said gripper rings positioned to receive spears discharged from said gripper rings and a plurality of dividers supported from said frame above ground level in advance of said gripper rings and in advance of said saw, each said divider being aligned with a gripper ring and shaped to bend an asparagus spear into the channel between an opposed pair of gripper rings.

5. A harvester according to claim 4 in which each said divider is generally triangular in side elevation, the bottom edge being horizontal, the front edge comprising a downwardly-forwardly directed prow, and the third edge being arcuately concave and approximately tangent to a sector of the lower forward quadrant of a gripper ring, said divider diverging rearwardly from a blunt point along said prow.

6. A harvester according to claim 4 which further comprises a deflector-guide and a resilient bracket fixed at its upper end to said divider and at its lower end to said deflector-guide resiliently suspending said deflector-guide ahead of the lower end of said divider, said deflector-guide being short and being wedge-shaped in top plan, said deflector-guide straddling the leading edge of said divider and positioned and arranged to divert asparagus spears to either side of the leading edge of said divider.

7. A harvester according to claim 4 in which said conveyor comprises an endless belt extending transversely of said frame and extending beyond one side of said frame and means on said frame driven by said means for driving said axle for moving said belt.

8. A harvester according to claim 7 in which said belt is corrugated on one surface, the depth and width of corrugations being sufficient to receive an asparagus spear.

9. A harvester according to claim 7 which further comprises a plurality of gates mounted on said frame in the path of asparagus spears held by said gripper rings prior to discharge onto said conveyor, said gates being flexible to fold rearward along the path of the spears and means on said frame adjacent said gates restraining forward folding of said gates.

10. A harvester according to claim 7 which further comprises a deflector mounted on the rear of said frame and extending transversely across and positioned above said conveyor to the rear of said gripper rings to direct said asparagus spears to fall butt downward on said conveyor.

11. A harvester according to claim 10 in which said deflector in side elevation is downwardly-forwardly inclined, the lower edge of said deflector being curved rearwardly to engage the lower edge of an asparagus spear butt.

12. A harvester according to claim 10 in which a resilient facing is attached to the forward face of said deflector.

13. A harvester according to claim 7 in which the top stretch of said conveyor extends horizontally immediately under the lower rear quadrant of said gripper rings and then extends upwardly to one side of said frame and which further comprises a hopper positioned under the outer end of said conveyor to receive spears discharged from the end of said conveyor.

14. A harvester according to claim 4 which further comprises a generally rectangular bandsaw frame connected to said frame, a pulley at each corner of said bandsaw frame around which said saw passes, and means on said frame for driving one of said pulleys, the lower horizontal stretch of said bandsaw extending transversely of said harvester below and slightly to the rear of the lowest points of said gripper rings.

15. A harvester according to claim 14 in which the forward edge of said saw is scalloped.

16. A harvester according to claim 14 in which is provided an arm mounted at one end of said bandsaw frame, one of said pulleys being mounted on the other end of said arm, and a spring biasing said arm to tighten said saw around said pulleys.

17. Gripping means for a harvester comprising a frame, a shaft, means mounting said shaft in said frame horizontal, a first and a second annular, vertically-disposed, parallel gripper ring concentric with said shaft and mounted thereon, a plurality of first radial spokes, a plurality of second radial spokes, means mounting said spokes for rotation with said shaft, said first spokes bearing against said first ring and biasing said first ring toward said second ring, a first set of shoes on said frame immediately below the front portion of said frame and adjacent said rings engaging a portion of the periphery of said first ring and moving a portion of said first ring away from said second ring, a second set of shoes on said frame adjacent the rear portion of said frame and immediately thereabove and adjacent said rings engaging a portion of the periphery of said first ring and moving a portion of said first ring away from said second ring, and means on said frame for mounting said shoes stationary relative to said rings, said shoes being positioned to open the space between rings before the bottom of the cycle of rotation, close said space approximately at the bottom of said cycle, and re-open said space approximately at the end of the bottom rear quadrant of said cycle.

18. Gripping means according to claim 17 which further comprises a pair of discs, one associated with each said ring, mounted for rotation with said shaft, one said disc shielding said first spokes and the other said second spokes.

19. Gripping means according to claim 17 in which is further provided means defining a plurality of spoke pockets fastened to one flat, annular face of each said ring, each said pocket being located on said ring to receive the outer end of one of said radially extending spokes and confine said spoke to radial movement relative to said ring.

20. Gripping means according to claim 17 in which is further provided a pair of annular rubber rings mounted on opposed annular surfaces of said gripper rings.

21. A divider for dividing growing stems of vegetables into one of two laterally spaced channels on either side of said divider, said divider comprising a shell generally triangular in side elevation, the bottom edge being substantially horizontal, the front edge comprising a downwardly-forwardly directed prow, and the third edge being arcuately concave, said divider diverging outwardly, rearwardly from said blunt pointed prow.

22. A divider according to claim 21 which further comprises a deflector-guide and a resilient bracket fixed at its upper end to said divider and at its lower end to said deflector-guide resiliently suspending said deflector-guide ahead of the lower end of said prow, said deflector-guide being short measured vertically and being rearwardly-outwardly diverging in top plan, said deflector-guide straddling the leading edge of said divider, said deflector-guide being movable rearwardly and sidewardly against the force of said bracket.

References Cited in the file of this patent

UNITED STATES PATENTS

| | | |
|---|---|---|
| 952,362 | Sandel et al. | Mar. 15, 1910 |
| 1,113,505 | Stone | Oct. 13, 1914 |
| 1,114,390 | Serres | Oct. 20, 1914 |
| 1,146,575 | Johnson | July 13, 1915 |
| 1,148,492 | Anthenill | Aug. 3, 1915 |
| 1,277,257 | Porterfield | Aug. 27, 1918 |
| 1,345,189 | Howser | June 29, 1920 |
| 1,539,258 | Graupner | May 26, 1925 |
| 1,684,886 | Rabie | Sept. 18, 1928 |
| 1,811,054 | Kipp et al. | June 23, 1931 |
| 2,009,755 | Wolfgram | July 30, 1935 |
| 2,151,436 | Nicholas et al. | Mar. 21, 1939 |
| 2,166,381 | Taylor et al. | July 18, 1939 |
| 2,283,528 | Betz et al. | May 19, 1942 |
| 2,337,528 | Stuckert et al. | Dec. 21, 1943 |
| 2,417,472 | Dorff | Mar. 18, 1947 |
| 2,466,555 | Paine et al. | Apr. 5, 1949 |
| 2,468,276 | Sorenson | Apr. 26, 1949 |
| 2,653,437 | Warner | Sept. 29, 1953 |
| 2,661,584 | Ronning | Dec. 8, 1953 |
| 2,731,780 | Witt | Jan. 24, 1956 |